Figure 1:
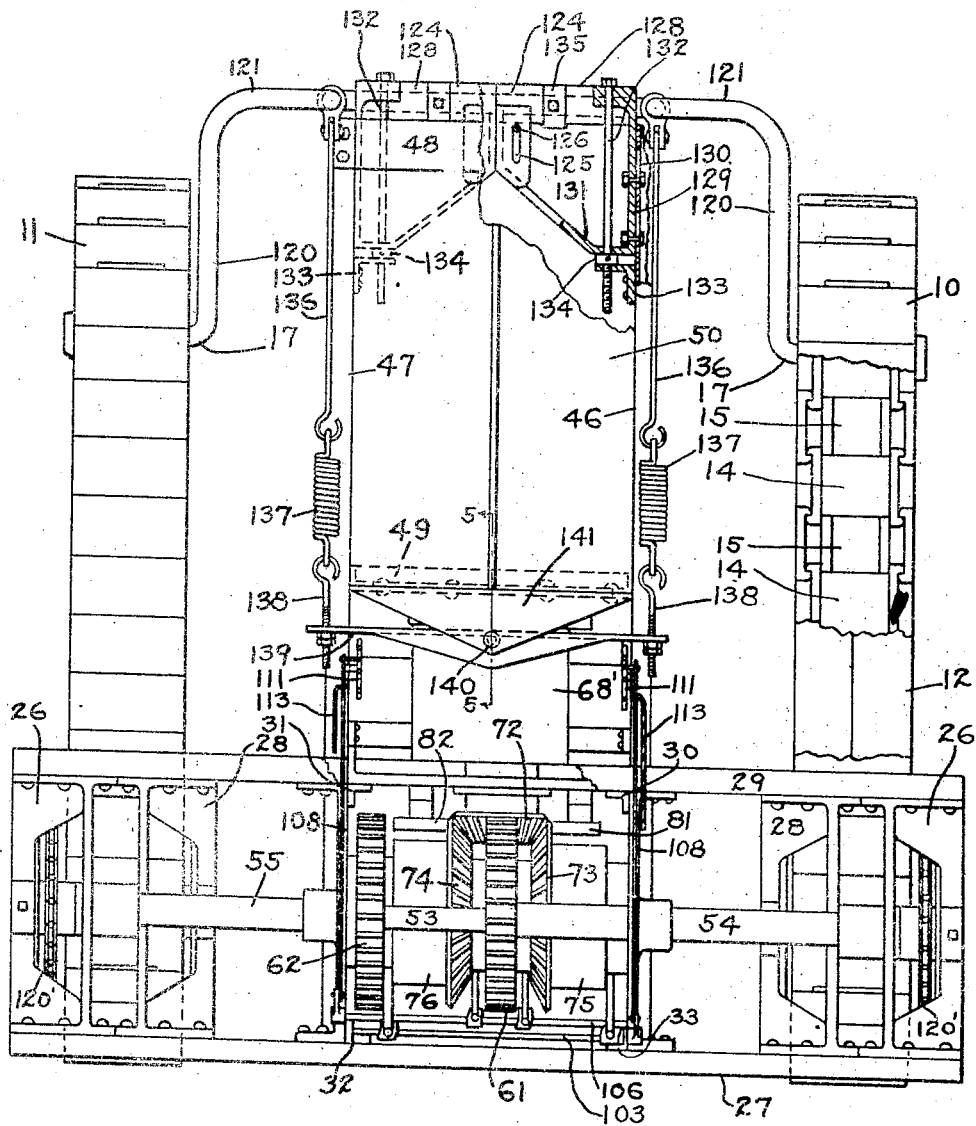

A. D. COLE.
TRACTOR.
APPLICATION FILED JULY 23, 1919.

1,336,890

Patented Apr. 13, 1920.
5 SHEETS—SHEET 1.

INVENTOR:
ARTHUR D. COLE.
BY Whiteley and Ruckman
HIS ATTORNEYS

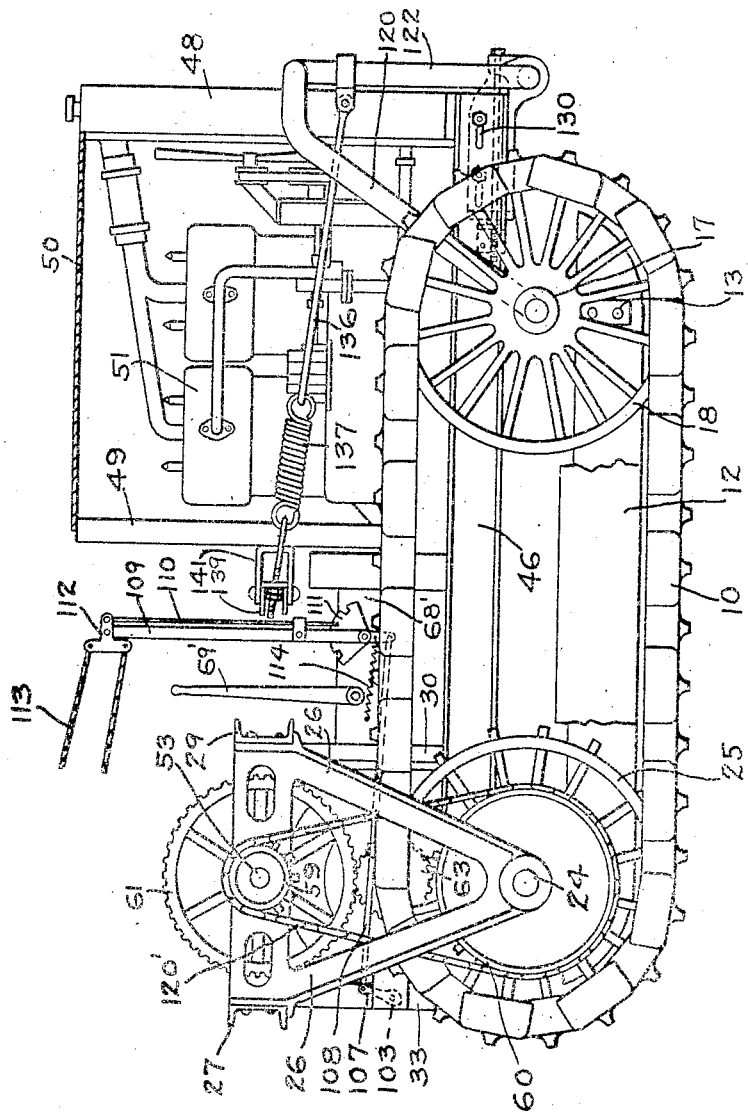

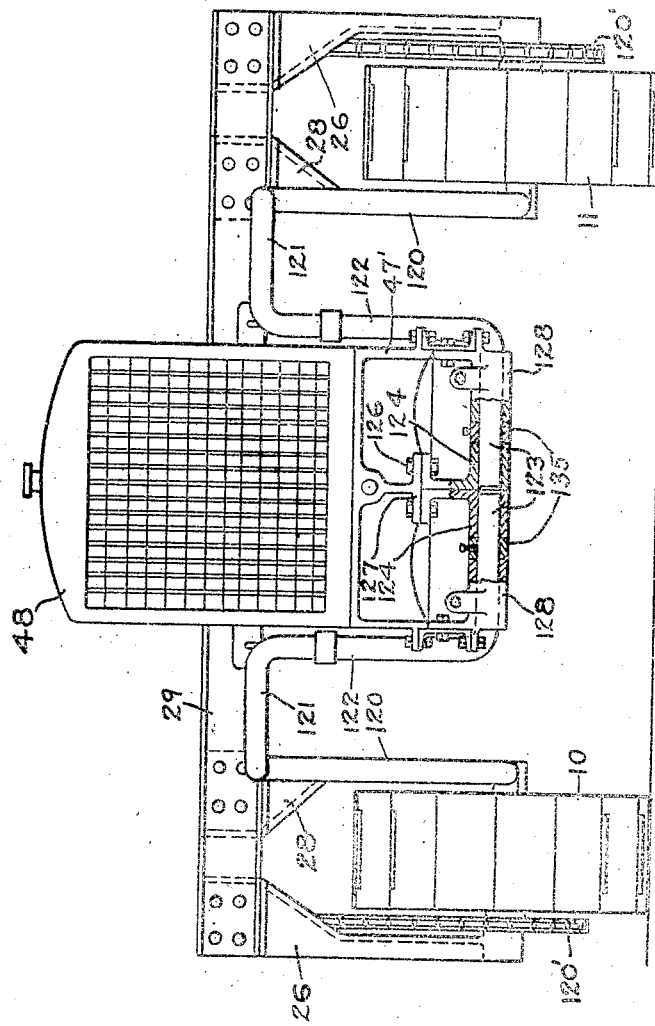

A. D. COLE.
TRACTOR.
APPLICATION FILED JULY 23, 1919.

1,336,890.

Patented Apr. 13, 1920.
5 SHEETS—SHEET 4.

INVENTOR
ARTHUR D. COLE
By Whiteley and Ruckman
HIS ATTORNEYS

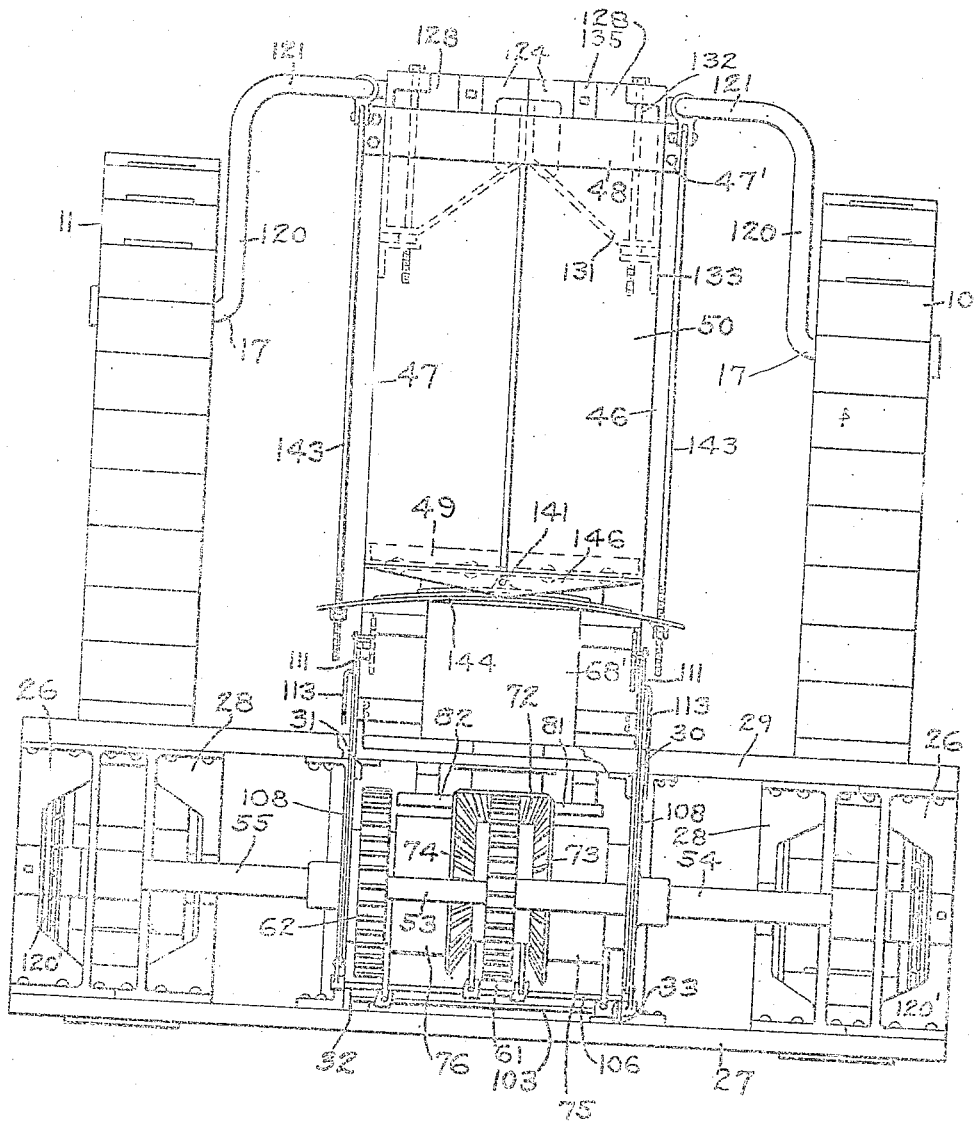

UNITED STATES PATENT OFFICE.

ARTHUR D. COLE, OF MINNEAPOLIS, MINNESOTA.

TRACTOR.

1,336,890.　　　Specification of Letters Patent.　　Patented Apr. 13, 1920.

Application filed July 23, 1919. Serial No. 312,679.

*To all whom it may concern:*

Be it known that I, ARTHUR D. COLE, a citizen of the United States, residing at Minneapolis, in the county of Hennepin and State of Minnesota, have invented certain new and useful Improvements in Tractors, of which the following is a specification.

My invention relates to tractors of the caterpillar type and has for an object to provide a tractor supported entirely on two caterpillar belts with means for independently driving the belts in the same or opposite directions to steer the tractor. Another object is to provide a tractor of this type which can be steered by reins. A further object is to construct the frame and driving elements so as to permit the tractor to be used for cultivating growing crops. A particular object is to pivotally support the caterpillar belts so that they may have independent oscillating movement in a substantially vertical direction to cause them to follow the contour of the ground in order to secure smoother running and the maximum tractive effort at all times.

The full objects and advantages of my invention will appear in connection with the detailed description thereof and the novel features embodied in my inventive idea will be particularly pointed out in the claims.

In the drawings, illustrating the application of my invention,—

Figure 5:
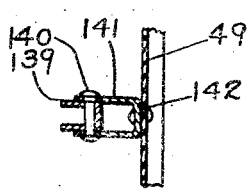
Figure 4:
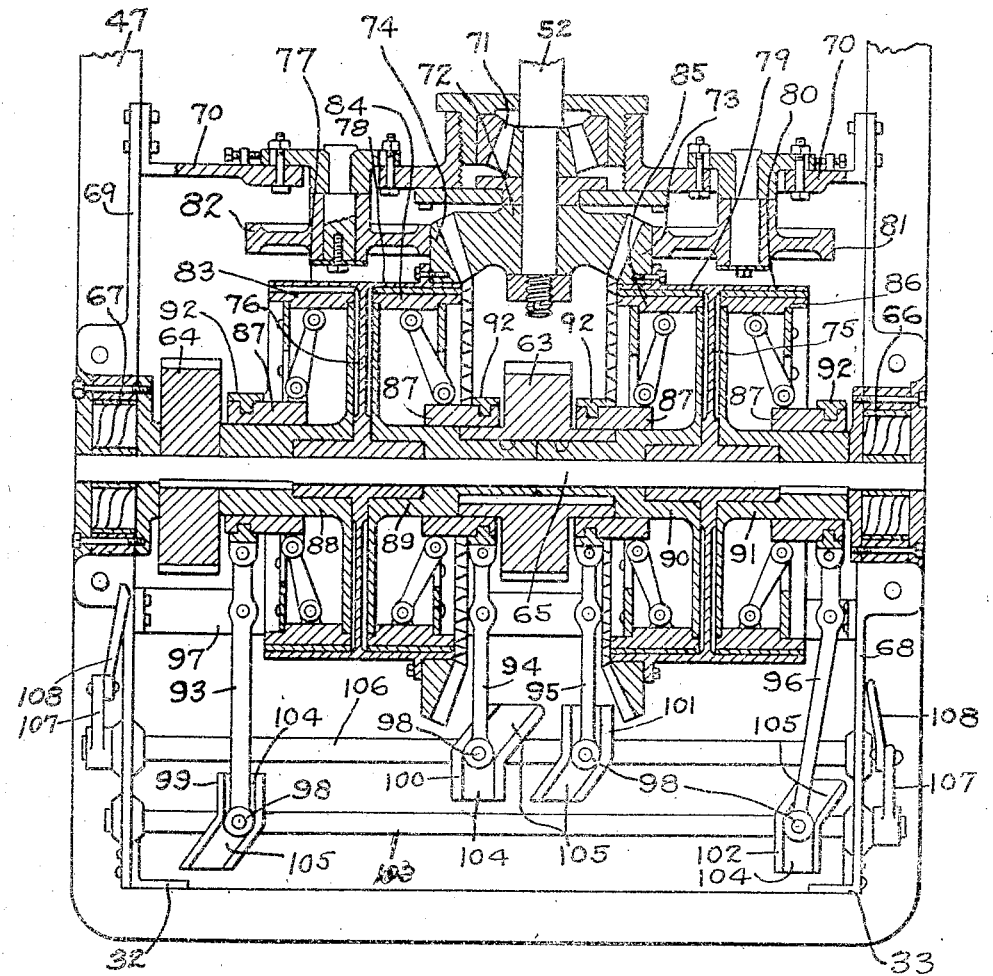

Figure 1 is a plan view of my improved tractor with some portions broken away or in section. Fig. 2 is a side elevational view. Fig. 3 is a front elevational view of the tractor showing a construction of the frame and supporting axles which permits the machine to be used for cultivating growing crops. Fig. 4 is a horizontal sectional view of the transmission and driving mechanism used in connection with my invention. Fig. 5 is a detail view in section on line 5—5 of Fig. 1. Fig. 6 is a plan view of a slight modification.

With ordinary forms of tractors of the caterpillar type great difficulty has been experienced in steering. It has been customary to raise the forward ends of the belts when it is desired to steer and to drive the tractor through the rear portion thereof and steer with ordinary steering or dirigible wheels. These steering wheels have been positioned so remotely from the belts in order to make the tractor turn that the length of the machine was too great to make a sharp turn. I overcome these difficulties by providing two belts with independent drives for each belt in a manner now to be described.

As shown in the accompanying drawings, my tractor is driven by two caterpillar belts 10 and 11 formed of separate links 14 and 15 of the self-supporting kind hooked together as shown in Fig. 1. Roof-shaped covers 12 are supported by hanger straps 13 so as to extend over each of the belts and protect them from dirt dropping from above. As shown in Fig. 1 these covers are divided at their ends to provide slots for the passage of the wheels over which the belts run. In order to support the caterpillar belts transverse axles 17 are provided upon which are mounted wheels 18 over which the front ends of the caterpillar belts pass. The manner in which the axles 17 are mounted will be described later. Rear axles 24 support driving wheels 25 over which the rear ends of the caterpillar belts pass. The axles 24 are carried by upright V-shaped castings 26 and 28 which are secured to transverse parallel beams 27 and 29. At the middle portions of the beams 27 and 29 are secured depending hangers 30, 31, 32 and 33 which support a transmission and engine frame having side beams 46 and 47 upon forward portions of which is bolted a transverse bar 47' upon which is mounted a radiator 48 of any usual construction. A support 49 conforming in configuration with the radiator is secured to the beams 46 and 47 near their middle portions. The support 49 and the radiator carry a hood 50 within which is positioned a power plant 51 secured to the beams 46 and 47. This power plant includes a rearwardly-extending driving shaft 52 which drives the tractor in a manner to be presently described.

In the plane of the beams 27 and 29, and between the same, is mounted a transverse shaft 53 extending completely across the tractor. Upon the ends of this shaft are rotatably mounted sleeves 54 and 55 which are journaled in the castings 26 and 28. Upon the outer ends of the sleeves 54 and 55 are secured sprocket wheels 59 which, by means of chains 120', drive sprocket wheels 60 secured to the driving wheels 25 of the tractor. The sleeves 54 and 55 carry at their inner ends gears 61 and 62 which mesh with pinions 63 and 64 mounted on a countershaft 65 journaled in bearings 66 and 67 formed on plates 68 and 69 supported on the vertical posts 30, 31, 32 and 33. The transmission and speed-changing elements of the tractor are best shown in Figs. 1 and 4. The driving shaft 52 may be driven at the desired speed by means of a speed-changing mechanism located in a casing 68' supported on the frame. This mechanism may be of the sliding gear or planetary type and is operated by a lever 69' pivoted to the casing 68'. A casting 70 extends between the beams 46 and 47 and carries an end thrust roller bearing 71 in which the shaft 52 is journaled. Upon the extreme end of this shaft is secured a beveled pinion 72 which meshes with a pair of beveled ring gears 73 and 74 rigidly secured to a pair of drums 75 and 76 which are mounted on the shaft 65 and are formed with oppositely-extending flanges 77, 78, 79 and 80. The end thrust of the gears 73 and 74 is taken up by a pair of rollers 81 and 82 which are rotatably mounted upon the bearing supporting member to bear upon the rear of said ring gears. Within the flanges formed on the drums 75 and 76 are positioned clutch members 83, 84, 85 and 86 which may be brought into engagement with the corresponding flanges by means of a number of sliding sleeves 87 to provide a driving connection between the ring gears 73 and 74 and a number of sleeves 88, 89, 90 and 91 to connect with the respective clutch elements 83, 84, 85 and 86. The sleeves 88 and 91 and the gear 64 are all keyed to the shaft 65, while the gear 63 and the sleeves 89 and 90 are rigidly secured together and ride loosely on the shaft 65. It is evident that the drums 75 and 76 rotate in opposite directions and that each of the gears 63 and 64 may be given either a right-hand or left-hand rotation through the respective clutch members connected therewith, since one of the sleeves connecting with each gear 63 and 64 may be driven from each of the ring gears 73 and 74 by properly operating the clutch members. For this purpose the shifting sleeves 87 are provided with shifting collars 92 which are independently operated by levers 93, 94, 95 and 96, all pivoted to a common support 97 secured to the bearing supports 68 and 69 previously referred to. Each of these levers is provided at its end with a roller 98 which rides in one of a number of cam pieces 99, 100, 101 and 102 mounted upon a pair of rocking shafts 103 and 106 journaled in bearing supports 68 and 69. It will be noted that each of these cams is provided with a spiraled portion 105 which when the shaft is oscillated causes the corresponding clutch element to be thrown into and out of engagement with the flanges of the drums 75 and 76, and that said cams are also provided with plane portions 104 which hold the clutch elements out of engagement with the corresponding drum flanges when the shafts 103 and 106 are oscillated with these portions in engagement with the respective rollers 98. These cams are so set with relation to the various rollers that, as each shaft is rocked the corresponding gear 64 or 63 is either thrown into right-hand or left-hand rotation or into neutral, but never into both. In this manner a separate control is obtained for each of the caterpillar belts by means of which the same may be simultaneously or independently driven in either direction. The devices for oscillating the shafts 103 and 104 may best be seen in Figs. 1 and 2. Crank arms 107 are attached to each of the shafts 103 and 106 and are connected by means of links or rods 108 to the lower ends of operating levers 109 pivoted upon the gear case 68'. These levers are provided with sliding rods 110 which may engage notched segments 111 to rock the levers for either forward or rearward travel of the tractor or to lock the levers in neutral position. The levers are held in forward position by means of coil springs 114 secured to the lower end thereof and secured to the casing 68'. At the top of the levers are mounted T-shaped pieces 112 which operate the rods 110 and to which may be attached looped cords or reins 113. By pulling on the upper part of the reins 113 the rods 110 are disengaged from the segments 111 and the levers 109 may take any one of their three positions. When it is desired to hold the levers in any of their positions the lower portions of the cords 113 are pulled, which causes the rods 110 to be engaged in the segments 111 and lock the levers. In steering the tractor it is only necessary to throw one of the belts on neutral and cause the machine to make a comparatively small turn. To make a sharp turn one of the belts is thrown into reverse.

Referring again to the front axles 17, it will be seen that these axles are formed with crank members each of which has the upwardly and forwardly extending portion 120, the inwardly extending portion 121, the downwardly extending portion 122 and the inwardly extending pivoted portion 123, the two portions 123 of a bearing coming adjacent each other but not being attached together. It will be understood that in case it is not desired to use the tractor for cultivating growing crops it is not necessary to provide the axles with the upwardly offset portions, and the axles may be continued in a more direct path to the bearings on the frame in which they are pivoted. The inner ends of the pivoted portions 123 are mounted in bearings having web portions provided with lugs 125 as shown in Fig. 1. Bolts 126 passing through these slots and through holes in a web portion 127 on the bearings 47' hold the bearings 124 in adjusted position. The outer ends of the portions 123 are mounted in bearings 128 having web portions 129 adjustably secured to the beams 46 and 47 by bolts passing through slots 130 in the latter and through holes in the webs. The portions 129 at the rear are provided with inturned portions 131 which extend for a short distance at right angles thereto and are then inclined forwardly and connect to the webs on the bearing members 124. Bolts 132 extend through the right angular front and rear portions of the webs 129, the rear end of these bolts being screw-threaded through angle irons 133 secured to the beams 46 and 47. Collars 134 are secured to the bolts 132 at the rear of the portions 131. When the nuts which secure the bearings 124 and 128 in place are loosened the bolts 132 may be turned for the purpose of moving the axles 17 forwardly to take up slack in the caterpillar belts. Collars 135 secured to the pivotal portions 123 between the bearings 124 and 128 serve to hold the pivotal portions rotatably in place in the bearings. In the form of invention shown in Figs. 1 and 2 rods 136 are secured at their forward ends to the portions 122 of the axles and at their rear ends are attached to springs 137, the latter being attached in a suitable manner, as by hook bolts 138 provided with adjustable locking nuts to an equalizer bar 139 pivoted at its center by a pin or bolt 140 to a supporting member 141 which is secured to the member 49. The supporting member 141 preferably consists of two parallel triangular plates connected by a right-angled web portion 142 through which the securing rivets or bolts extend. The central portion of the bar 139 also preferably consists of two parallel triangular plates connected by a web portion, these plates being closer together than the plates of the member 141 so as to fit between the latter plates. In the construction shown in Fig. 6 instead of the rods 136 previously referred to, rods 143 are employed and the rear ends of these rods are attached by adjustable lock nuts to an equalizer bar 144 consisting of overlapping leaf springs. This bar is pivoted at its center by a pin or bolt 145 to a supporting member 146 which is secured to the member 49.

The operation and advantages of my invention will be readily understood from the foregoing description. When the caterpillar belts rest upon a flat surface their lower stretches are held in a common plane by the action of the springs and the equalizer bar, but when the ground is uneven it results from the pivotal action of the equalizer bar and the turning movement of the portions 123 of the front axle members that the forward portions of the belts will oscillate so as to conform to the contour of the ground. This not only prevents racking and side strains, but a maximum tractive effort is obtained at all times and the tractor runs smoothly without swaying motion of the frame. As will be evident from Fig. 3, the tractor may be readily used for cultivating growing crops on account of the open space beneath the front portions 121 of the front axles and on account of the open space provided for the rear supports. The tractor is compactly arranged and may be used for all farm purposes and can be hitched to any implement and driven like a horse in the manner previously described by pulling upon the reins.

I claim:

1. A tractor comprising a frame, a pair of driving wheels rotatably mounted on said frame, a pair of crank axles pivotally supported at their inner ends upon said frame, supporting wheels rotatably supported by the other ends of said crank axles, resilient means associated with said crank axles for allowing said supporting wheels to swing upwardly, and caterpillar belts supported upon said driving and supporting wheels.

2. A tractor comprising a frame, a pair of driving wheels rotatably mounted at the rear portion of said frame, a pair of crank axles pivotally supported at their inner ends upon the front portion of said frame, supporting wheels rotatably supported by the other ends of said crank axles, resilient means associated with said crank axles for allowing said supporting wheels to swing upwardly, and caterpillar belts supported upon said driving and supporting wheels.

3. A tractor comprising a frame, a pair of driving wheels rotatably mounted at the rear portion of said frame, a pair of forwardly-extending crank axles pivotally supported at their front ends upon the front portion of said frame, idler wheels rotatably supported by the other ends of said crank axles, resilient means interposed between said crank axles and said frame for allowing said idler wheels to swing upwardly, and caterpillar belts supported upon said driving and idler wheels.

4. A tractor comprising a frame, a pair of driving wheels rotatably mounted at the rear portion of said frame, a pair of crank axles pivotally supported at their inner ends upon the front portion of said frame, idler wheels rotatably mounted upon the other ends of said crank axles, an equalizer bar pivoted to said frame and connected to said crank axles whereby said idler wheels are allowed to swing upwardly independently of each other, and caterpillar belts supported upon said driving and idler wheels.

5. A tractor comprising a frame, a pair of driving wheels rotatably mounted at the rear of said frame, a pair of crank axles pivotally supported at their inner ends upon the front portion of said frame, idler wheels rotatably mounted upon the other ends of said crank axles which are resiliently held downwardly, an equalizer bar pivoted at its center to said frame, connections between the outer ends of said equalizer bar and the intermediate portions of said crank axles, and caterpillar belts supported upon said driving and idler wheels.

6. A tractor comprising a frame, a pair of driving wheels rotatably mounted at the rear portion of said frame, a pair of crank axles pivotally supported at their inner ends upon the front portion of said frame, idler wheels rotatably mounted upon the other ends of said crank axles, a resilient equalizer bar pivoted at its center to said frame, connections between the outer ends of said equalizer bar and the intermediate portions of said crank axles, and caterpillar belts supported upon said driving and idler wheels.

7. A tractor comprising a frame, rear and front supports connected to said frame so as to extend upwardly therefrom, outwardly away from the sides of said frame and then downwardly whereby a clearance is provided to permit the tractor to be used for cultivating growing crops, supporting and driving wheels rotatably mounted on the lower outer ends of said supports, and caterpillar belts mounted on said wheels.

8. A tractor comprising a frame, supports connected to the rear of said frame, crank axles connected to the front of said frame, said supports and crank axles extending upwardly from said frame, outwardly away from the sides thereof and then downwardly whereby a clearance is provided to permit the tractor to be used for cultivating growing crops, driving wheels rotatably mounted on the lower outer ends of said supports, supporting wheels rotatably mounted on the lower outer ends of said crank axles, and caterpillar belts mounted on said driving and supporting wheels.

In testimony whereof I hereunto affix my signature.

ARTHUR D. COLE.